April 6, 1926.  
J. R. GAMMETER  
METHOD AND APPARATUS FOR MAKING TUBES  
Filed August 30, 1922  
1,579,300  
2 Sheets-Sheet 2

Inventor  
John R. Gammeter  
By Robert M. Pierson  
Atty.

Patented Apr. 6, 1926.

1,579,300

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING TUBES.

Application filed August 30, 1922. Serial No. 585,156.

*To all whom it may concern:*

Be it known that I, JOHN R. GAMMETER, a citizen of the United States, residing at Akron, in the county of Summit and State of Ohio, have invented a certain new and useful Method and Apparatus for Making Tubes, of which the following is a specification.

This invention relates to the manufacture of tubes, particularly rubber tubes such, for example, as those which later are vulcanized and spliced to form endless inner tubes for automobile tires.

In the manufacture of tubes of this character, it is the common practice to lay a sheet of unvulcanized rubber upon an inextensible support and then to place a hollow cylindrical pole or mandrel upon the near edge of said rubber sheet and roll said mandrel until it is covered with several layers of rubber. The mandrel, thus covered, is then progressively wrapped with a strip of fabric in overlapping helical convolutions, to force any entrapped air from between the rubber and the mandrel, or from between the several plies of rubber. The wrapping is later removed and the tube thereafter vulcanized.

The chief objects of my invention are to provide an improved method and apparatus for making tubes in which the unvulcanized rubber will be stretched before its application to the forming pole and thus be under tension when wrapped thereon; to reduce the number of steps in the operation; and to produce an improved article.

Of the accompanying drawings, Fig. 1 is a plan view of the apparatus for practicing my invention, with the work in position, ready for operation.

Figure 1:
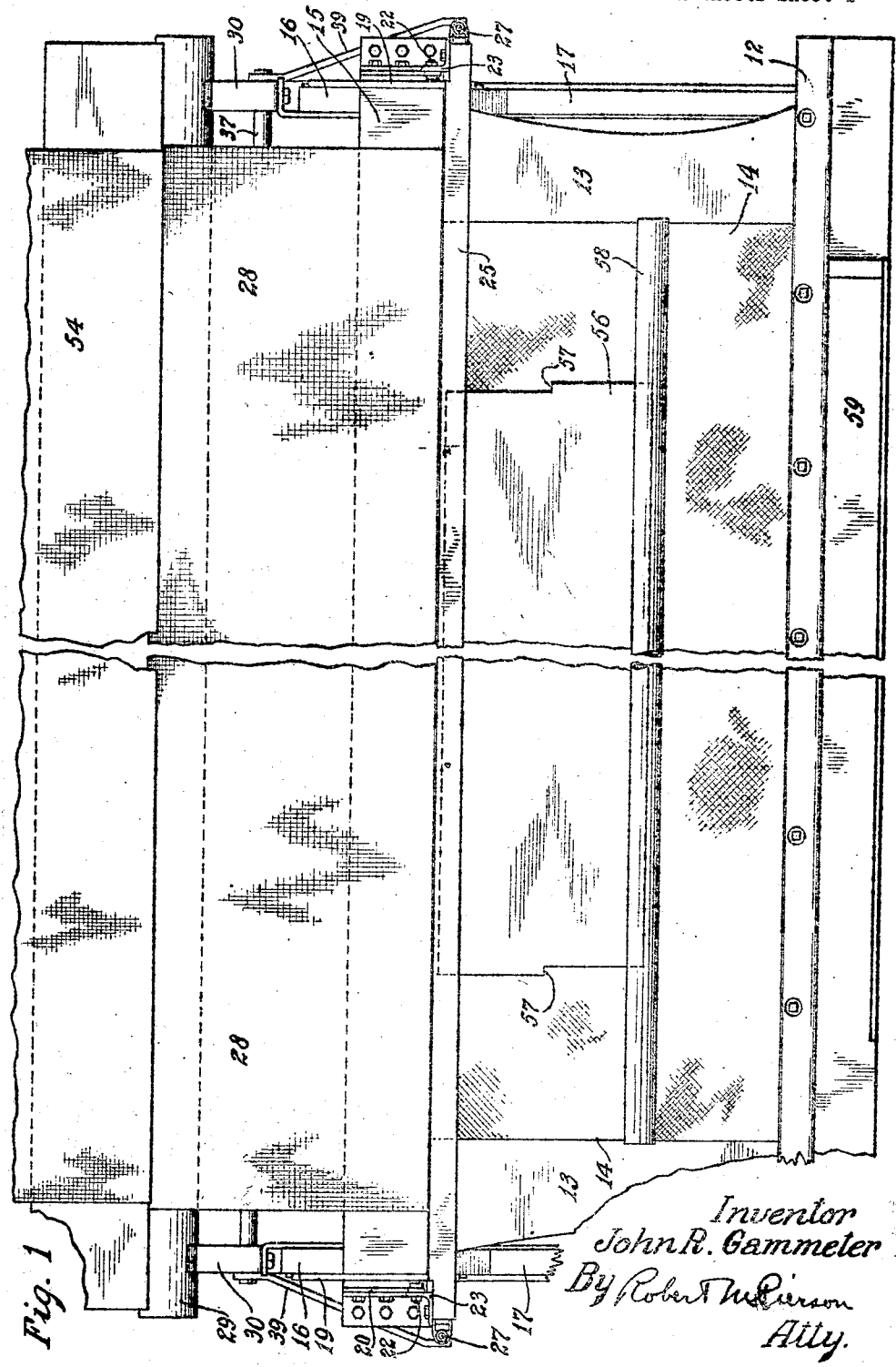
Figure 2:
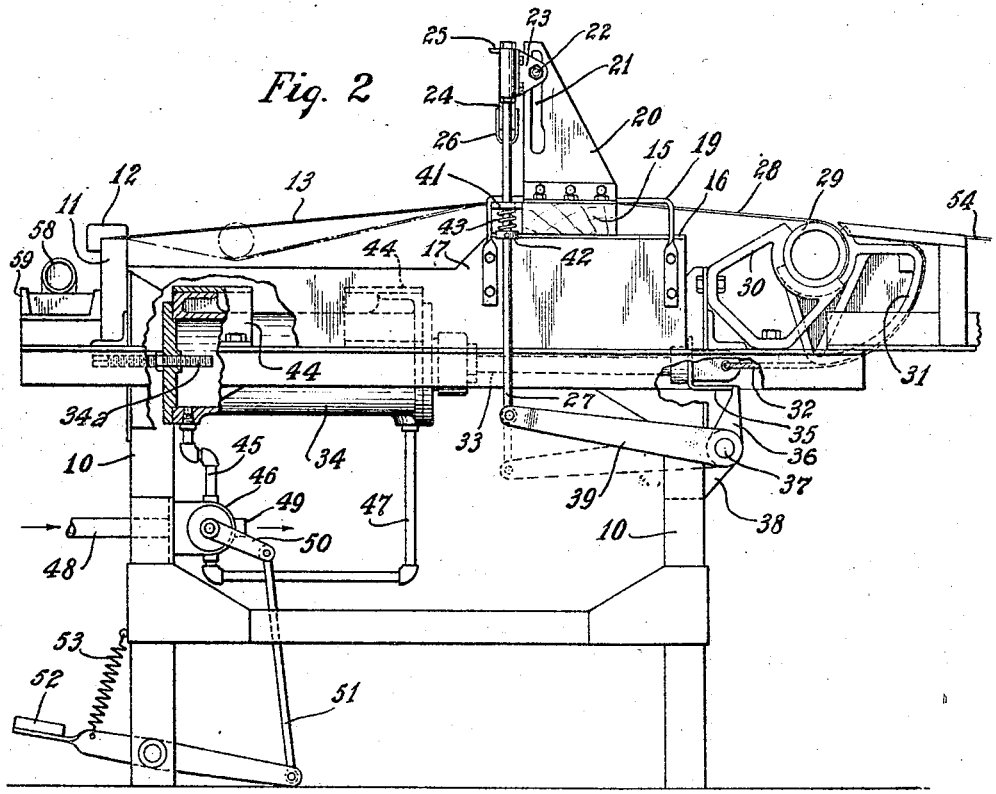
Fig. 2 is a side elevation, with parts broken away.

Referring to the drawings, 10 is a rectangular table-like frame having thereon a fixed, upright support 11 extending along its front side, which is the near side as viewed in Fig. 1, and is at the left in Fig. 2. Secured to the top of the support 11 is a clamping strip 12, the support and the clamp 12 serving as an anchorage for one edge of an elastic apron 13, said apron being made of vulcanized rubber and having its upper surface substantially covered with extensible fabric such as stockinet, shown at 14, to lessen the adhesion of tacky, unvulcanized rubber thereto.

The opposite edge of the elastic apron 13 is clamped between the two longitudinal sections $15^a$, $15^b$ of a tensioning beam 15, which extends the length of the apparatus near its middle, overhangs the ends thereof, and is slidably mounted on transverse trackways 16, 16 under its ends, said trackways consisting of flat metal strips mounted on upright supports 17, 17 at each end of the frame 10 and being turned upward at their front ends as shown at 18 to limit the movement of the tension beam 15 toward the support 11 and to determine a minimum tension for the elastic apron 13. Metal straps 19, 19 secured to the supports 17, 17 and passing over the tensioning beam serve to hold it securely in place upon the trackways.

Mounted upon the overhanging ends of the tensioning beam are upright plates 20, 20 having therein guide slots 21, 21 having enlarged lower ends, in which slots are mounted lugs 22, 22, said lugs extending through said slots from respective arms or brackets 23 projecting laterally from a vertically movable clamping beam 24, the latter being mounted above and parallel to the tensioning beam 15 and disposed edgewise thereto. It is preferably of wood, with a reinforcing angle-iron 25 along its upper edge, and its lower edge is provided with a yielding cushion 26. A downwardly extending supporting rod 27 is attached to each of its ends and associated with parts hereinafter described.

Secured at one of its edges, between the two sections of the tensioning beam 15, along with the extensible apron 13, is an inextensible apron 28 of canvas or other flexible fabric, having its opposite or rear edge extending partly around and secured to the periphery of a rocking cylinder 29. The rocking cylinder is mounted at its ends in semicircular journals in brackets 30, 30 mounted on the rear part of the frame 10, and at its middle said cylinder is provided with a rearwardly extending lever 31 in the form of quadrant, the periphery of which is grooved to receive a flexible pull cord or wire 32, said wire being secured to the rear shoulder of said quadrant, passing downward around its periphery, and extending forward, its forward end being secured to the piston rod 33 of a fluid pressure cylinder 34.

The piston rod 33 is provided with a crosshead 35 running between suitable guides on the frame 10 and having its lower portion bent rearwardly to form an abutment adapted to engage the end of an upwardly extending lever 36, when said piston rod is in its outer or rear-most position. The lever 36 is secured to the middle of a rock shaft 37 journaled in brackets 38 secured to the frame 10, and the outer ends of the rock shaft 37 are provided with forwardly extending levers 39, 39, to the forward ends of which are pivoted the lower ends of the clamping-bar-supporting rods 27. Guide-plates 41, provided with relatively large apertures through which the rods 27 freely pass, are secured to the tension beam 15, and a compression spring 43 on each rod between the guide plate and an adjustable collar 42 secured on each rod below the guide plate is provided, to limit and cushion the upward movement of said supporting rods 27.

The fluid pressure cylinder 34 is suspended from brackets 44, 44 mounted on the frame 10 beneath the apron 13. A fluid supply pipe 45 connects the front end of the cylinder with a four-way valve 46, and a pipe 47 connects the rear end of the cylinder with the same valve, said valve also being provided with a fluid inlet pipe 48 and an exhaust pipe 49. The valve 46 is provided with an operating lever 50 connected by a link 51 with a treadle 52 provided with a return spring 53, for charging either end of the cylinder while exhausting the opposite end. An adjustable stop 34ª in the front end of the cylinder limits the movement of the piston in that direction, and the cylinder head limits its movement in the opposite direction. The spring 53 is adapted to keep the operative mechanism of the apparatus in position to receive the work, that is, with the clamping beam 24 raised, and the tensioning beam 15 in forward position, with the elastic apron 13 under minimum tension and with the piston of the fluid pressure operated device in its outermost position.

An inclined apron 54 is provided at the back of the table, adapted to support mandrels with rolled tubes thereon as they roll from the apron 28 to a soapstoning cabinet (not shown).

To manufacture tubes by the use of my apparatus, two operators, standing at the front of the machine, place a sheet of unvulcanized rubber 56, having its end outlines off-set as at 57, 57, upon the elastic apron 13 so that one of its edges rests upon the tensioning beam 15 under the raised clamping beam 24. They then place a pole or mandrel 58, (which has previously been laid in a convenient channel 59 on the front of the machine), upon the near edge of the sheet 56, as shown in Fig. 1, and while bearing upon said mandrel to hold said edge firmly against the apron 13, depress the treadle 52, which reverses the flow of fluid through the valve 46 and into the cylinder 34, thus causing the piston-rod 33 to move inward.

As the piston rod so moves inward, it first withdraws the cross-head 35 from engagement with the lever 36, permitting the clamping beam 24 quickly to descend, of its own weight, upon the tensioning beam 15, to hold securely in place the edge of the stock 56 laid thereupon. The inward movement of the piston also pulls the cord 32 attached to the quadrant 31, thus rotating the rocking cylinder 29, causing the latter to wrap about itself the inextensible apron 28, the travel of which draws the tensioning beam 15 and the clamping beam 24, mounted thereon, toward the right as viewed in Figs. 2 and 3, to stretch the elastic apron 13. The enlarged lower ends of the slots 21 permit the clamping bar 24 to accommodate its position to that of the connected parts without causing the pad 26 to slide upon the stock. The sheet of unvulcanized rubber, being held in frictional engagement with the apron 13 by means of the clamping bar 24 and the mandrel 58, is thereby stretched with the apron. The stock is thus smoothed and freed from wrinkles.

Figure 3:
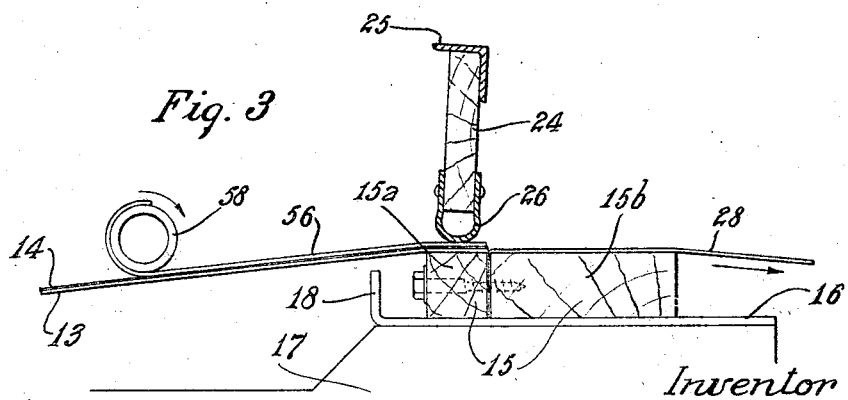
Fig. 3 is a fragmentary, sectional view showing the action of the apparatus upon the work.

As soon as the tensioning beam 15 stops moving, the operators roll the mandrel forward, as shown in Fig. 3, over the unvulcanized sheet 56, which being somewhat tacky, adheres to the mandrel and is wrapped thereabout in a plurality of adjacent convolutions, until the wrapped mandrel abuts the clamping beam 24. The sheet may be further stretched if desired, by bearing downward on the mandrel to deflect the apron 13 during the wrapping operation. The operators then release the treadle 52, permitting the tensioning beam to be drawn forward to normal position by the contraction of the elastic apron 13 and causing the clamping beam 24 to rise. The mandrel is then rolled forward to wrap thereon the relatively small remainder of the unvulcanized sheet, and then is permitted to roll over the inextensible apron 28 (which is inclined somewhat downward) and over the adjacent apron 54 into the soapstoning cabinet, where soapstone dust is applied to the exposed surface of the unvulcanized tube.

The extremities of the rubber tube, which are thinner than the rest of its structure because of the off-sets 57 in the end outlines of the original flat sheet, are then tightly bound against the mandrel with the tape, to give skived or beveled ends to the finished tube, after which the tube is vulcanized. The wrapping of fabric around the unvulcanized tube to force the entrapped air therefrom is dispensed with, this effect being obtained by the wrapping of the unvulcanized sheet under tension, and I have found that tubes made by my process have practically no entrapped air.

The tension of the rubber against the mandrel results in a smooth finish on the adjacent surface of the tube when the latter is vulcanized, and the tube is turned inside out when stripped from the mandrel, so that such smooth surface is outermost in the finished tube.

I have found that the natural tackiness of the unvulcanized rubber sheet 56, causing it to adhere with considerable tenacity to the stockinet apron covering 14, makes it possible to operate my apparatus without using the clamping beam 24 to increase the frictional engagement of the stock with the apron 13 at the lateral edge of the rubber sheet. Thus the clamping beam 24 may be rendered inoperative and the unvulcanized sheet stretched merely by laying it flat upon the elastic apron and actuating the fluid pressure device to draw back the tensioning beam, thus, through stretching the apron, likewise stretching the rubber sheet in frictional engagement therewith. The mandrel may then be placed upon the near edge of the stock and wrapped therein as heretofore described.

Moreover, it is possible, if desired, to stretch a sheet of unvulcanized rubber without varying the distance between the lateral supports of the apron. To do this, the unvulcanized sheet 56 is placed upon the elastic apron 13, and the mandrel 58 placed upon its near edge and downward pressure applied thereto substantially to deflect and stretch the apron, and consequently the unvulcanized sheet thereon, as shown in dot and dash lines in Fig. 2. The mandrel is then rolled forward to wrap the stretched sheet onto the mandrel, as in the procedure previously described.

Modifications may be resorted to without departing from the scope of my invention and I do not limit my claims wholly to the specific construction shown, nor to the exact procedure described.

I claim:

1. The method of making tubes which comprises uniformly stretching a sheet of elastic material substantially throughout its area, and then wrapping a mandrel therein, while holding said sheet in such uniformly stretched condition.

2. The method of making tubes which comprises stretching a sheet of elastic material substantially throughout its area, and then wrapping it about a mandrel in the direction of its elongation while holding it so stretched.

3. The method of making tubes which comprises laying a sheet of adhesive, elastic material upon an elastic support, uniformly stretching the material by a general stretching of said support, and rolling a mandrel on said material while the latter is so stretched, to wind it about the mandrel.

4. The method of making tubes which comprises laying a sheet of elastic material upon a stretchable, flexible support, while supporting the latter, in the manner of a catenary, by engagement with its opposite margins only, laying a mandrel upon a margin of said material, flexing and stretching said support by pressing said mandrel against it to stretch the material thereon, and then rolling the mandrel on said material while the latter is so stretched, to wind the material about the mandrel.

5. The method of making tubes which comprises laying a sheet of stretchable material upon an extensible suport, laterally moving one edge of said support to stretch it and the material thereon, then rolling a mandrel on said material while the latter is so stretched, to wind the material upon the mandrel.

6. The method of making tubes which comprises laying a sheet of stretchable material upon an extensible support, augmenting the adhesion between said material and support by pressing them together at their margins, extending said support to stretch the material thereon, and then rolling a mandrel on said material while the latter is so stretched, to wind the material upon the mandrel.

7. Apparatus for making tubes, said apparatus comprising an elastic apron adapted to support a sheet of stock for the rolling of a mandrel thereon, and anchorage means engaging opposite margins of said apron for supporting it in the manner of a catenary, said apron having its concave surface exposed for the rolling of a mandrel thereover to pick up the sheet of stock.

8. Apparatus for making tubes, said apparatus comprising an elastic apron adapted to support a sheet of stock for the rolling of a mandrel thereon, anchorage means engaging opposite margins of said apron for supporting it in the manner of a catenary, and means for varying the distance between said anchorage means to stretch said apron.

9. In apparatus of the character described, the combination of an elastic apron for supporting a sheet of elastic material laid thereon, a stationary support for one edge of said apron, a movable support for its opposite edge, a stock-clamping member carried by said movable support, and means for moving the latter to stretch said elastic apron and the stock thereon.

10. In apparatus of the character described, the combination of an elastic apron adapted to support a sheet of material laid thereon, lateral supports for said apron, means for moving one of said supports a determinate distance to stretch said apron, a clamping member adapted to clamp said material against the support so moved, and means for actuating said clamping member and moving said support in determinate relation.

11. In apparatus of the character described the combination of an elastic apron adapted to support a sheet of material, a stationary support for one edge of said apron, a movable support for its opposite edge, a flexible sheet member attached to said movable support for actuating it to stretch said elastic apron and the sheet of material thereon, said sheet member being adapted to support a mandrel with said material wound thereon as it rolls from said elastic apron.

In witness whereof, I have hereunto set my hand this 25 day of August, 1922.

JOHN R. GAMMETER.